United States Patent
Wellnitz et al.

(10) Patent No.: US 6,403,960 B1
(45) Date of Patent: Jun. 11, 2002

(54) CORRECTION FOR SPATIAL VARIATIONS OF DEADTIME OF A MONOLITHIC SCINTILLATOR BASED DETECTOR IN A MEDICAL IMAGING SYSTEM

(75) Inventors: Donald R. Wellnitz; Michael J. Petrillo, both of Pleasanton; Lingxiong Shao, San Jose, all of CA (US)

(73) Assignee: Koninklijijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/302,161

(22) Filed: Apr. 29, 1999

(51) Int. Cl.[7] .............................................. G01T 1/164
(52) U.S. Cl. ................... 250/363.09; 250/369
(58) Field of Search ........................ 250/370.11, 370.06, 250/363.02, 363.03, 363.04, 363.07, 363.09, 370.09, 390.11, 369, 391

(56) References Cited

U.S. PATENT DOCUMENTS 5,585,637 A  * 12/1996 Bertelsen et al. ...... 250/363.03

* cited by examiner

Primary Examiner—Georgia Epps
Assistant Examiner—Richard Hanig
(74) Attorney, Agent, or Firm—Eugene E. Clair

(57) ABSTRACT

A nuclear medicine imaging system includes the capability to correct for the deadtime, including the capability to correct for spatial variations in deadtime across the imaging surface of a detector. The imaging system includes one or more radiation detectors, each using a large, monolithic scintillation crystal. Each detector has deadtime associated with it. A given detector is used to acquire an energy profile of a patient based on emission radiation. The detector includes a number of timing channels. The energy profile is used to select a zone influence map indicating the extent of spatial overlap in response between the various timing channels. Emission data of the patient is then acquired during an emission scan. During acquisition of the emission data, a rate meter assigned to each timing channel samples the number of counts associated with each timing channel to acquire deadtime data. A unique deadtime function is provided for each unique zone represented in the zone influence map, including each region of overlap. The deadtime data acquired from the rate meters are then applied to the deadtime functions to correct the emission data for deadtime on a pixel-by-pixel basis. An image is generated based on the deadtime-corrected data.

57 Claims, 11 Drawing Sheets

CORRECTION FOR SPATIAL VARIATIONS OF DEADTIME OF A MONOLITHIC SCINTILLATOR BASED DETECTOR IN A MEDICAL IMAGING SYSTEM

FIELD OF THE INVENTION

The present invention pertains to the field of medical imaging. More particularly, the present invention relates to techniques for correcting for deadtime in a nuclear medicine imaging system.

BACKGROUND OF THE INVENTION

In nuclear medicine, images of internal structures or functions of a patient's body are generated by using an imaging system to detect radiation emitted from within the body after the patient has been injected with a radiopharmaceutical substance. The imaging system typically uses one or more scintillator-based detectors to detect the radiation. A computer system generally controls the detectors to acquire data and then processes the acquired data to generate the images. Nuclear medicine imaging techniques include Single-Photon Emission Computed Tomography (SPECT) and Positron Emission Tomography (PET). SPECT imaging is based on the detection of individual gamma rays emitted from the body, while PET imaging is based on the detection of gamma ray pairs that are emitted in coincidence in opposite directions due to electron-positron annihilations. PET imaging is therefore often referred to as "coincidence" imaging. Certain nuclear medicine imaging systems use a small number of (e.g., two) monolithic (continuous) scintillation crystal based detectors, such as dual SPECT/PET systems available from ADAC Laboratories of Milpitas, Calif. Other systems use detectors that consist of a grid of many scintillation crystals, sometimes referred to as "block detectors", as with many dedicated PET systems.

One factor that can affect image quality in nuclear medicine imaging systems is deadtime loss. Deadtime can be defined as the inability of a detector to distinguish two distinct scintillation events that occur very close together in time. In other words, deadtime is the time, after detecting an event, during which the detector is "busy" and therefore unable to detect another event. Both the scintillation crystal and the associated electronics may be subject to deadtime. Deadtime loss can be defined as the difference between the true countrate and the observed countrate. FIG. 1 illustrates the effect of deadtime losses in the form of a plot of observed countrate against true countrate. Line 2 represents the ideal yet unrealistic case in which there is no deadtime loss; in that case, the observed countrate OC equals the true countrate C1. In contrast, line 3 represents the response of an imaging system that is subject to deadtime loss; in that case, the observed countrate OC is lower than the true countrate C2. Because deadtime loss is dependent upon the singles rate, deadtime loss increases as the singles rate (true countrate) increases.

One technique for correcting for deadtime loss is to apply a calibration factor to data acquired during an imaging session. For example, deadtime loss can be estimated for a particular imaging system during a pre-clinical calibration session with the use of phantoms. During a clinical imaging session, a correction for the estimated deadtime loss can be applied to the acquired data. One problem with this approach is that deadtime often is not uniform across the imaging surface of the detector, due to variations in the scintillation crystal, parameter of the electronics, and other factors. This problem particularly affects imaging systems that use large, monolithic crystal detectors, which have much larger imaging surfaces than those of block detectors. Also, because deadtime is a function of singles rate, these spatial variations can be exacerbated by the particular energy profile of each patient. Thus, the size, shape, and composition of the patient may contribute to variations in deadtime losses across the imaging surface of the detector. Accordingly, deadtime correction based on pre-clinical calibration and/or the use of phantoms tends to be inaccurate.

SUMMARY OF THE INVENTION

An imaging system has a radiation detector which includes a monolithic scintillator and which has deadtime associated with it. A method of correcting for the deadtime includes generating data of an object in response to radiation detected by the detector, correcting the data for spatial variations in deadtime across an imaging area of the monolithic scintillator, and generating an image of the object based on the corrected data.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for correcting for spatial variations in deadtime across the imaging surface of a monolithic scintillator based detector are described. As will be described in greater detail below, a detector is used to acquire an energy profile of a patient based on emission radiation. The imaging surface of the detector is partitioned into a matrix of pixels as well as a number of timing channels. The energy profile is used to select a zone influence map from, among a number of possible zone influence maps. The zone influence map is a function of the physical characteristics of the detector and indicates the spatial overlap characteristics between the timing channels of the detector, given the patient's energy profile. The detector is then used to acquire emission data of the patient during a standard emission scan. In the detector, a rate meter is assigned to each timing channel. During acquisition of the emission data, each rate meter samples the number of counts associated with the corresponding timing channel to acquire deadtime data. A unique deadtime function is provided for each unique region of the zone influence map. The deadtime data acquired from the rate meters are then applied to the appropriate deadtime functions, based on the zone influence map, to correct the emission data for deadtime on a pixel-by-pixel basis. An image is then generated based on the deadtime-corrected data.

Figure 1:
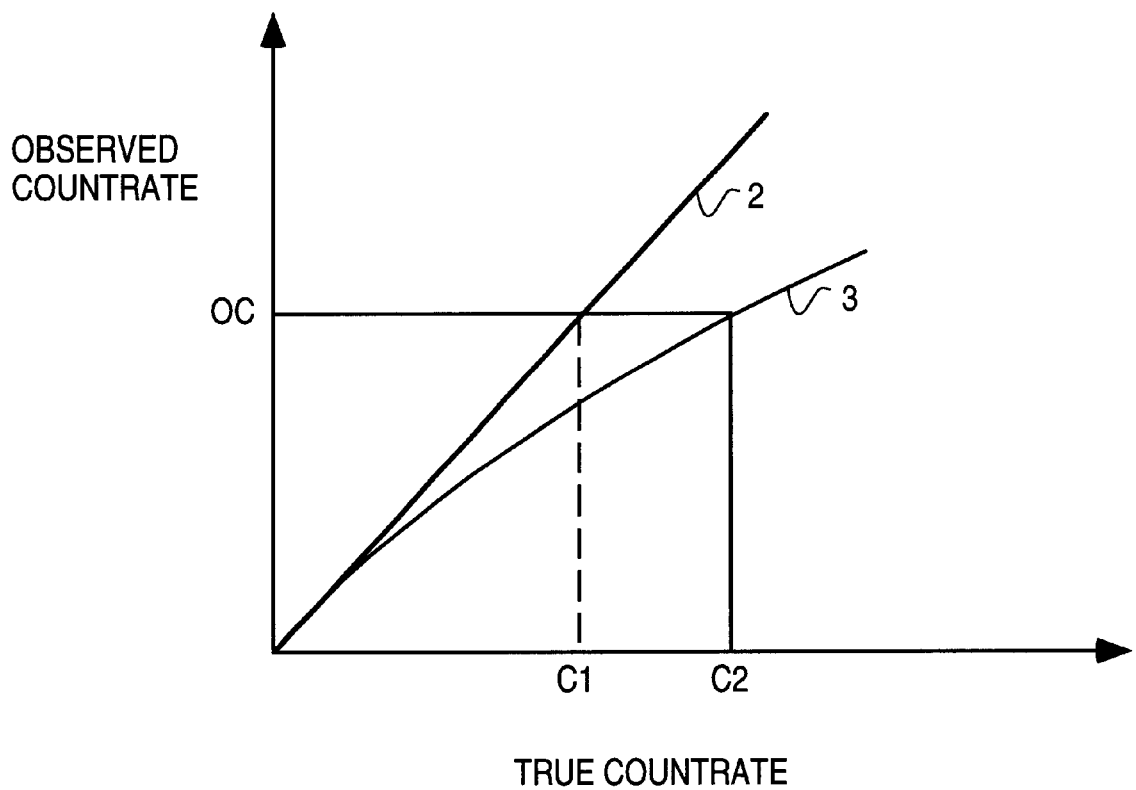
FIG. 1 is a graph illustrating deadtime loss as a function of count rate
Figure 2A:
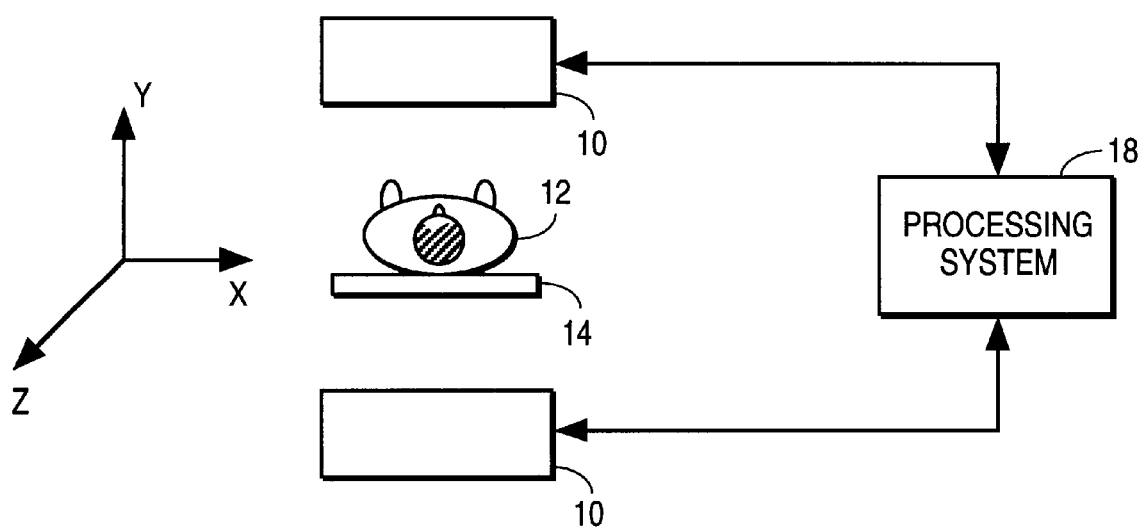
FIG. 2A is a block diagram of a dual-detector nuclear medicine imaging system.

FIG. 2A is a block diagram of a dual-detector gamma camera system capable of both single-photon (SPECT) and coincidence (PET) imaging. Note that while the described deadtime correction technique is well-suited for use in such a dual SPECT/PET system, the technique can also be used advantageously in a dedicated coincidence (PET) imaging system or in a dedicated SPECT system. The system of FIG. 2A includes a processing system 18 coupled to two scintillation detectors 10. Each of the detectors 10 includes a single, large monolithic (continuous) scintillator, such as a NaI(Tl) crystal. As will be described further below, each of the detectors 10 includes components for detecting scintillation events in response to gamma radiation and for providing data representing detected events to the processing system 18. The detectors 10 may be supported by a gantry (not shown) that is capable of rotating the detectors 10, either individually or in unison, about an axis of rotation that is perpendicular to the x-y plane (parallel to the z axis), and of moving the detectors in translation along the z axis. During an imaging session, a patient 12 rests on a table 14 positioned between the detectors 10. In FIG. 2A, the detectors 10 are shown configured in a 180 degree orientation relative to each other about an axis of rotation that passes through the patient 12 parallel to the z axis, as is appropriate for coincidence imaging.

The processing system 18 controls the overall operation of the gamma camera system, including receiving data acquired by the detectors 10, processing the data, and reconstructing images based on the data. The processing system 18 controls certain functions of the detectors 10 using various control signals. The processing system 18 may be, or may include, for example, one or more of: a conventional computer system, such as a personal computer (PC), a workstation, alternative embodiments, however, some of the above-mentioned functions of the processing system 18, or aspects thereof, may instead be implemented within the detectors 10, the gantry, or in other distinct modules. Thus, processing system 18 may actually be embodied as multiple distinct processing systems.

Figure 2B:
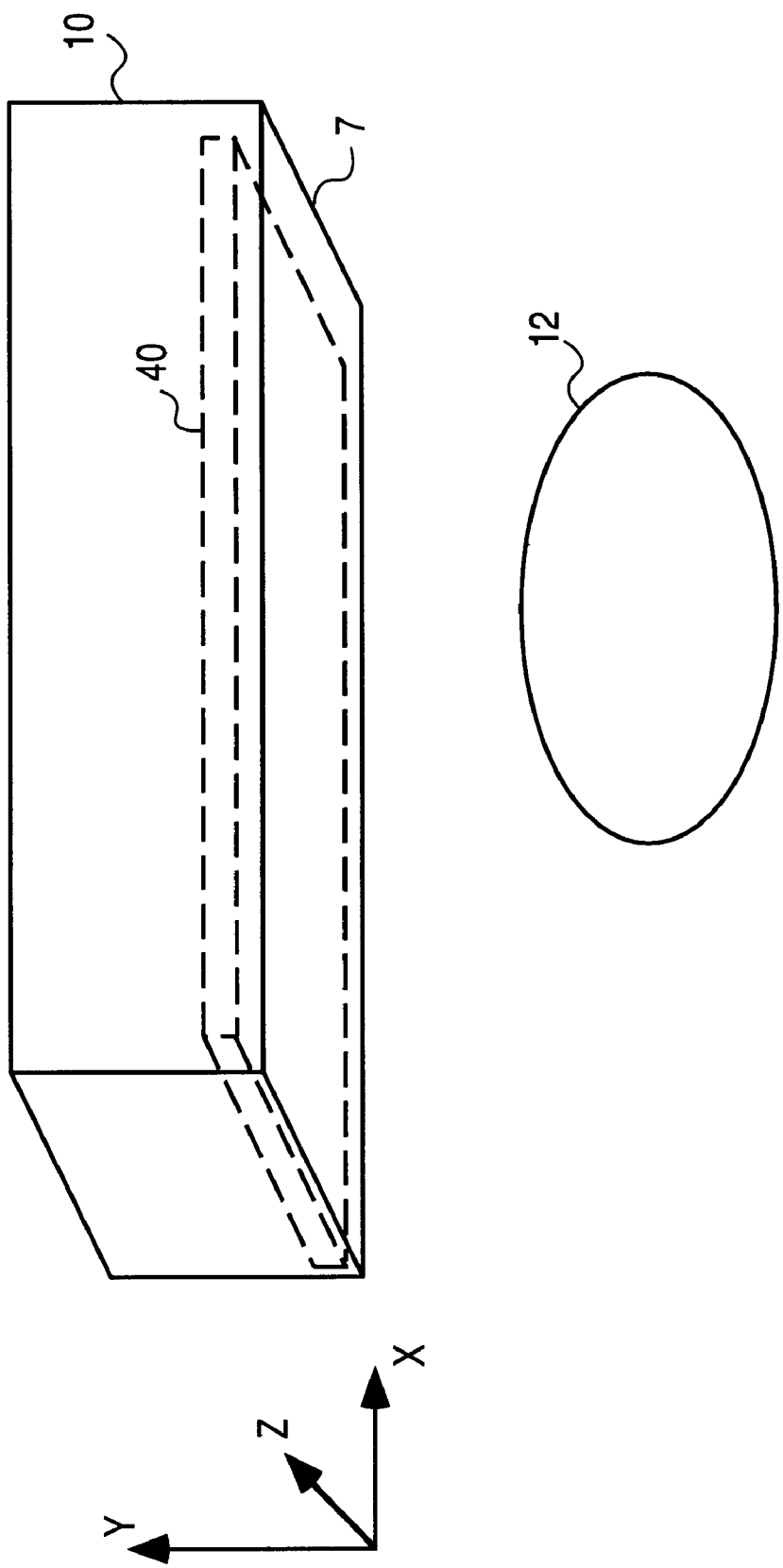
FIG. 2B illustrates a detector of the imaging system.

FIG. 2B illustrates one of the two detectors 10 of the imaging system shown in FIG. 2A, relative to the x, y, and z axes. Both detectors 10 may be assumed to be identical for purposes of this description. The detector 10 has an imaging surface 7, which is the surface of the detector 10 that is closest to the patient during data acquisition. The scintillation crystal 40 is enclosed within the detector 10 at the imaging surface 7. The scintillation crystal 40 is substantially flat and rectangular, having length and width nearly equal to those of the detector 10. As noted above, deadtime of the detector 10 may vary across the imaging surfaces 7 of the detector 10 along the x axis, the z axis, or both. The deadtime correction technique described herein corrects for such variations, as will be further described below.

Figure 3:
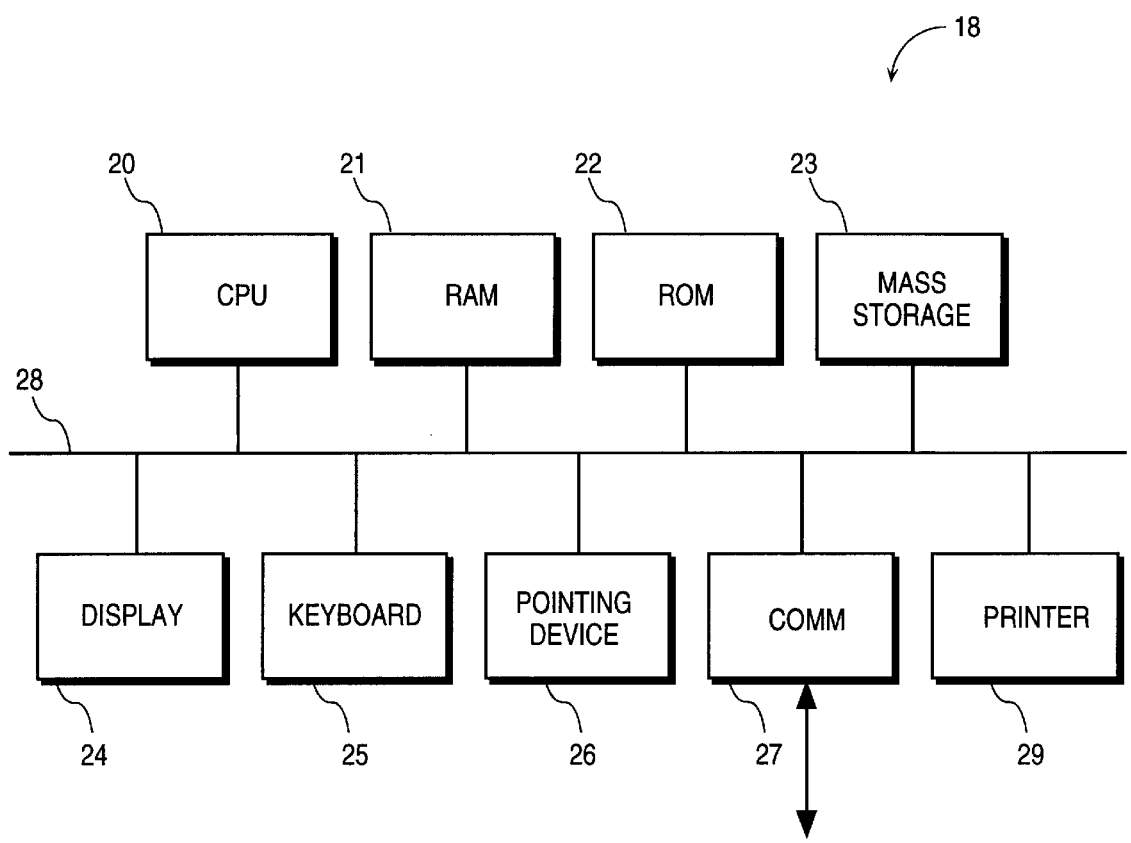
FIG. 3 is a block diagram of the processing system of the imaging system.

FIG. 3 illustrates a block diagram of the processing system 18 according to one embodiment. In the illustrated embodiment, the processing system 18 includes a central processing unit (CPU) 20, random access memory (RAM) 21, read-only memory (ROM) 22, and a mass storage device 23, each coupled to a bus system 28. The bus system 28 may represent multiple physical buses coupled together by appropriate bridges, controllers, and/or adapters. Also coupled to the bus system 28 are a display device (including appropriate display controller) 24, which may be a cathode ray tube (CRT), liquid crystal display (LCD), or the like; a keyboard 25; a pointing device 26, such as a mouse, trackball, touchpad, or the like; a communication device 27; and a printer 29. Communication device 27 may be used to implement the data and control signals to and/or from the detectors 10 and/or other computer systems or components. Communication device 27 may be, for example, a simple transceiver, a network adapter, a modem, or any other suitable data communication device. Display device 24 and printer 29 may be used to display and print, respectively, tomographic images reconstructed by processing system 18.

Figure 4:
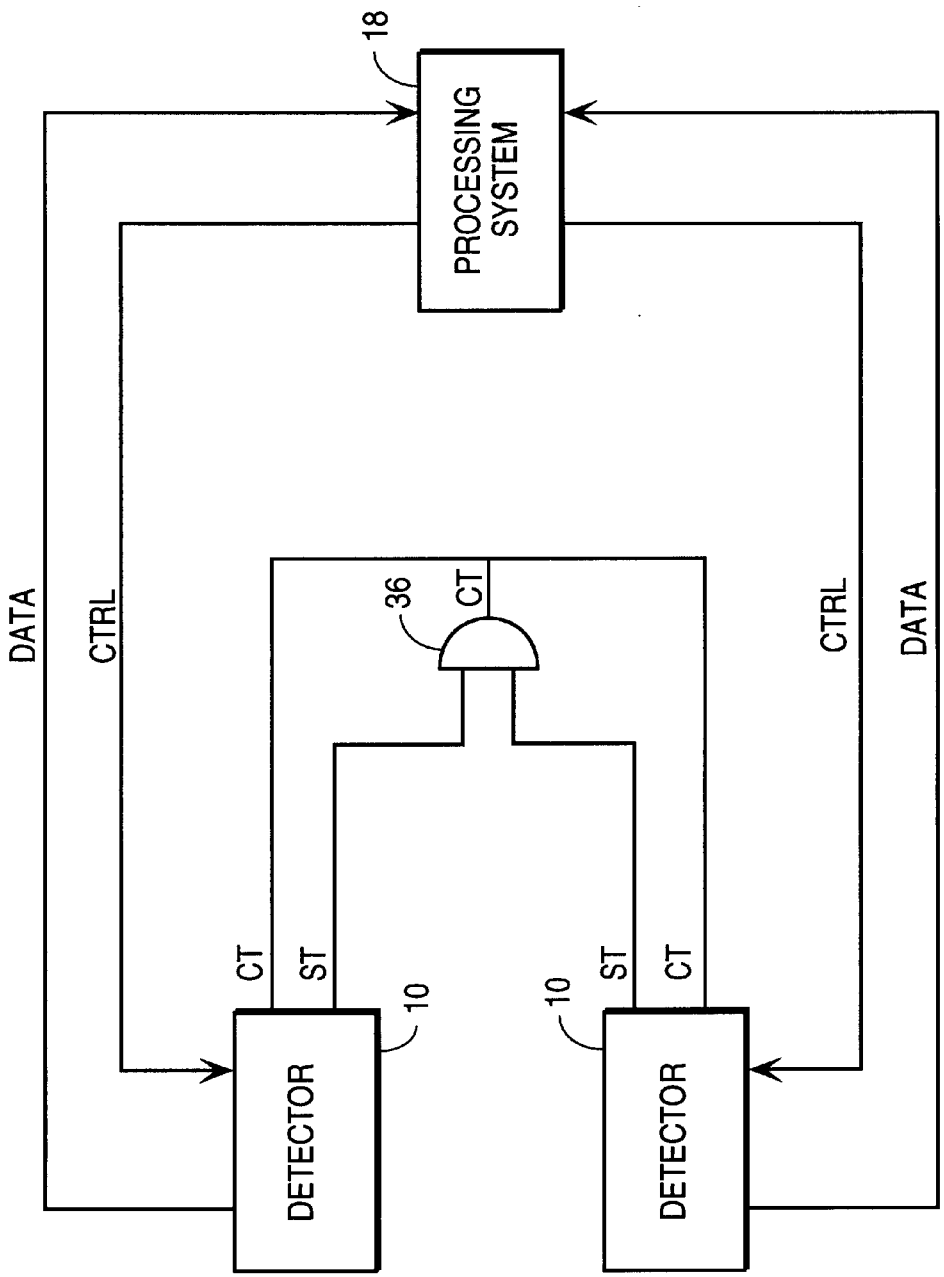
FIG. 4 is a block diagram of the imaging system showing the coincidence detection circuitry (CDC).

FIG. 4 illustrates the coincidence detection circuit of the gamma camera system, which enables the system to be used in PET mode. As shown, each of the detectors 10 outputs trigger pulses via singles trigger signals ST in response to each detected scintillation event. The singles trigger signal ST from each detector is applied to an input of the coincidence detection circuit (CDC) 36, which outputs a coincidence trigger signal CT to each of the detectors 10. The CDC 36 may be a simple (logic) AND gate, as shown. When the system is in coincidence mode, each of the detectors 10 responds to assertion of the coincidence trigger signal CT by registering the position and energy of the corresponding scintillation event. When the system is in single-photon mode, each of the detectors 10 registers position and energy data in response to assertion of its singles trigger signal ST; the coincidence trigger signal CT is not used. Position data (i.e., x, y coordinates) and energy data for registered events are provided by each of the detectors 10 to the processing system 18 via the data (DATA) signals. The processing system 18 controls certain functions of the detectors 10 using various control (CTRL) signals. The CTRL signals may include clock signals for controlling data transfers, programming signals for programming variable delays, mode selection signals (e.g., PET or SPECT), and other signals, the specifics of which are not germane to the present invention.

Figure 5:
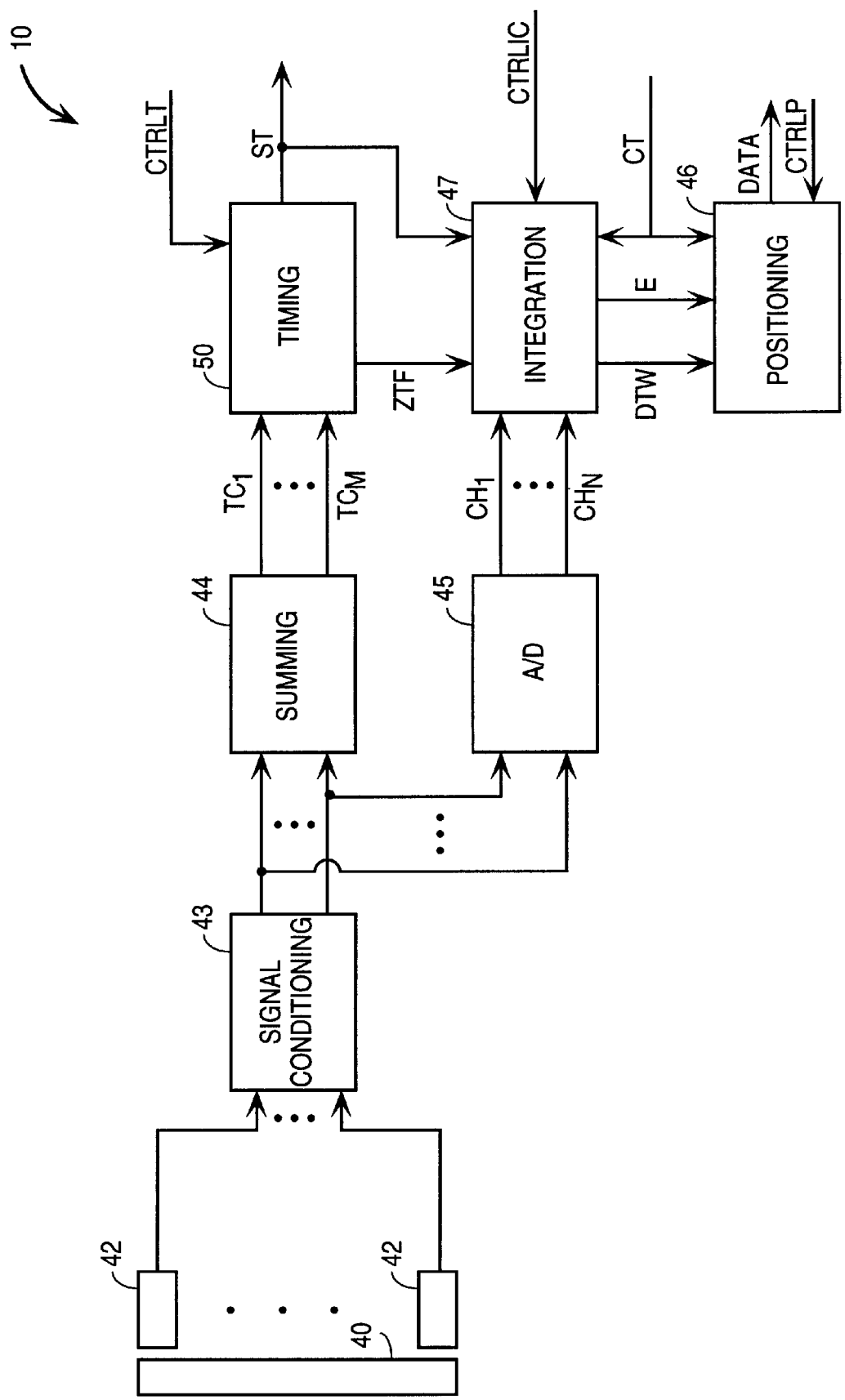
FIG. 5 illustrates internal components of a detector of the imaging system.

FIG. 5 illustrates the internal components of a detector 10, according to one embodiment. The detector 10 includes the scintillation crystal 40, an array of photomultiplier tubes (PMTs) 42, a signal conditioning circuit 43, a summing network 44, an analog-to-digital (A/D) converter 45, a positioning circuit 46, an integration circuit 47, and a timing circuit 50. The scintillation crystal is optically coupled to the PMTs 42. The outputs of the PMTs 42 are applied to signal conditioning circuit 43. The signal conditioning circuit 43 provides amplification and normalization of the PMT outputs and, if needed, other types of signal conditioning. The signal conditioning circuit 43 outputs, for each PMT output, a separate amplified signal to both summing network 44 and to analog-to-digital (A/D) circuit 45. The A/D circuit 45 converts the amplified PMT outputs to digital values, which are provided as PMT channel signals $CH_i$ to integration circuitry 47 (i=1, 2, . . . , N, where N is the number of PMTs in the detector).

Integration circuitry 47 integrates event pulses in the PMT channel signals $CH_i$ to produce integrated energy (E) values, which are provided to positioning circuitry 46. Integration circuitry 47 also generates a digital trigger word (DTW)

signal, which is also provided to positioning circuitry 46. The DTW signal is a multi-bit digital value, i.e., one bit for each PMT in the detector. The state of each DTW bit at any given point in time indicates whether the corresponding PMT is affected by the most recently detected scintillation event based on its integrated energy E. Integration circuitry 47 may also correct for pulse pile-up. Integration circuitry 46 may be controlled, at least in part, by integration control signals CTRLIC from processing system 18, which are a subset of the above-mentioned CTRL signals.

Positioning circuitry 46 computes position (x,y) coordinates associated with scintillation events. In response to assertion of the appropriate signal, positioning circuitry 46 registers the position and energy (E) data for a corresponding scintillation event and provides the data to the processing system 18 via the DATA signal. Positioning circuitry 46 may be controlled, at least in part, by position control signals CTRLP from processing system 18, which are a subset of the CTRL signals.

Figure 6:
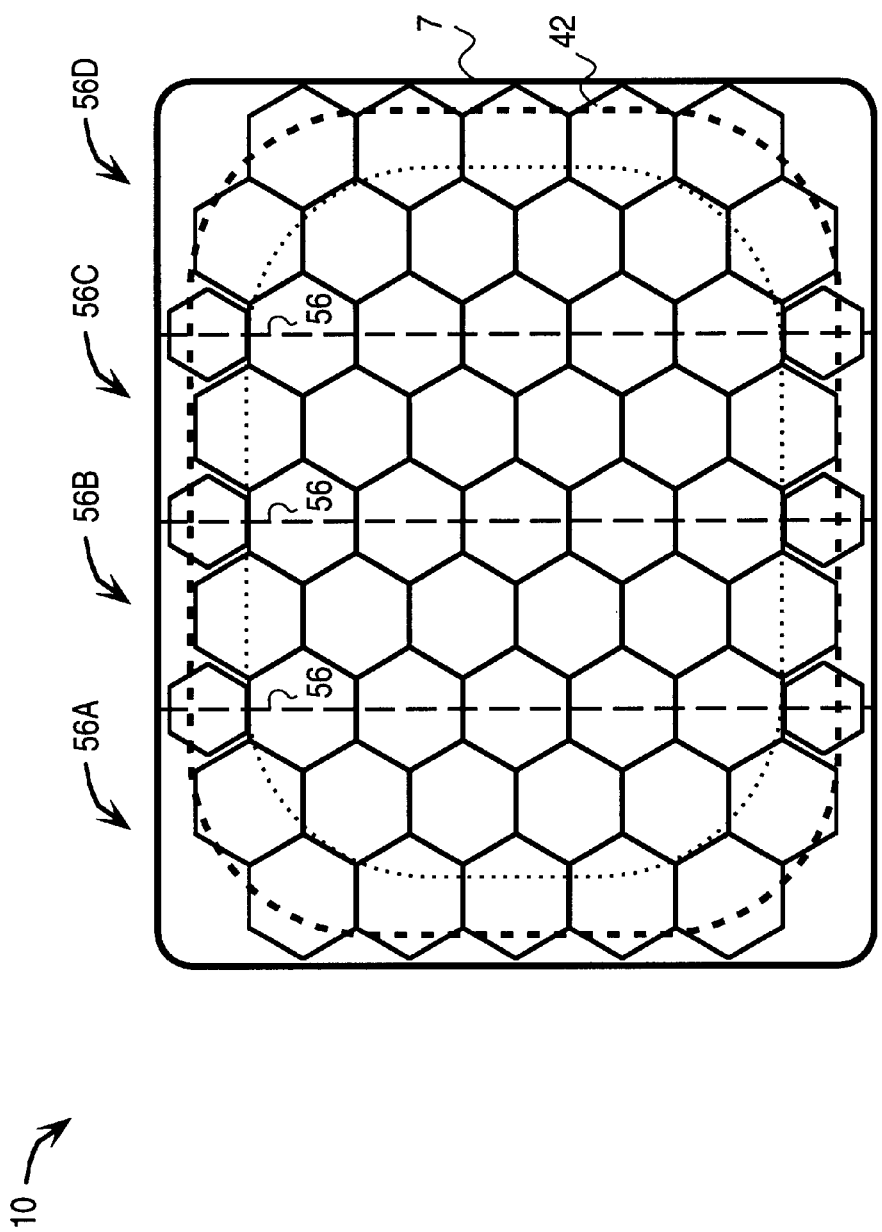
FIG. 6 illustrates a detector imaging surface partitioned into four timing channels.

The imaging surface of each of the detectors 10 is partitioned into a number of timing channels. Each timing channel includes a subset of the array of PMTs 42. FIG. 6 illustrates the imaging surface of a detector 10 and an example of how the imaging surface may be partitioned into multiple timing channels. The illustrated detector 10 has four timing channels, A, B, C and D, corresponding to regions 56A, 56B, 56C and 56D, respectively, of the imaging surface 7, the boundaries of which are denoted by vertical lines 56. Note that many variations in the number and shape of the timing channels are possible.

Thus, referring again to FIG. 5, the summing network 44 receives the amplified outputs of the individual PMTs from the signal conditioning circuit 43 and sums the amplified outputs to generate one output $TC_j$ for each timing channel (j=1, 2, ..., M, where M is the number of timing channels on the detector). Summing network 44 then provides each timing channel output $TC_j$ to timing circuitry 50. Timing circuitry 50 applies a signal-level threshold function to the timing channel outputs $TC_j$ and, for the timing channel outputs $TC_j$ that meet the threshold level, generates pulses of singles trigger ST signal. Timing circuitry 50 also generates a timing channel trigger function (ZTF) signal in response to each scintillation event which meets the threshold level, which is provided to integration circuitry 47. The ZTF signal is a multi-bit digital value, i.e., one bit for each PMT in the detector. The state of each ZTF bit at any given point in time indicates whether the corresponding PMT is affected by the most recently detected scintillation event. Although DTW and ZTF contain substantially similar information, ZTF indicates pre-integration trigger status, whereas DTW indicates post-integration trigger status. Timing circuitry 50 may be controlled, at least in part, by timing control signals CTRLT from processing system 18, which represent a subset of the CTRL signals.

The boundaries of the timing channels of the detector 10 are fixed. However, due to the light spread characteristics of scintillation events, a given scintillation event may affect more than one timing channel, particularly if the event occurs close to the boundary between two or more timing channels. The ability of events to affect more than one timing channel may be referred to as the "zone influence" characteristics of the detector. The zone influence characteristics define various "zones of influence" (or "zones") of the detector imaging surface. Each zone corresponds to one timing channel. A zone is defined as the region for which an event occurring anywhere in the region will produce a response in the corresponding timing channel. The spatial layout of the zones on the imaging surface reflects both the spatial partitioning of the timing channels and the spatial overlap in timing channel responses.

Referring again to FIG. 2B, deadtime of the detector 10 may vary with position along the imaging surface 7 relative to the x axis, the z axis, or both. The deadtime correction technique described herein applies the zone influence principle to correct for such variations. In particular, deadtime is a function of zone influence. Assume a given event falls within the spatial overlap region of two or more timing channels. Although one of the timing channels may be busy due to a previous event and fail to register the given event, at least one other timing channel may not be busy and therefore detect the given event. Hence, events which fall within the zones of influence of more than one timing channel will contribute less statistically to the overall deadtime of the detector than events which fall within the zone of influence of only one timing channel.

Note that the zone influence characteristics of a detector are a function of both the physical configuration and parameters of the detector and the energy profile of the particular patient being imaged. The energy profile may be a simple histogram of detected energy vs. position. Hence, the described technique involves generating or selecting a zone influence map of each detector for each patient. The zone influence map specifies the spatial layout of the zones relative to the imaging surface of the detector for a given detector-patient combination. Each zone corresponds to one timing channel. Again, the layout of the zones reflects the layout of the timing channels and the spatial overlap of timing channel responses. The spatial layout of the timing channels is fixed, and the timing channels do not physically overlap, regardless of the size and shape of the patient. However, the spatial layout of the influenced zones may change from patient to patient, and two or more zones may overlap. The manner of generating or selecting the zone influence map is described in greater detail below.

Figure 7:
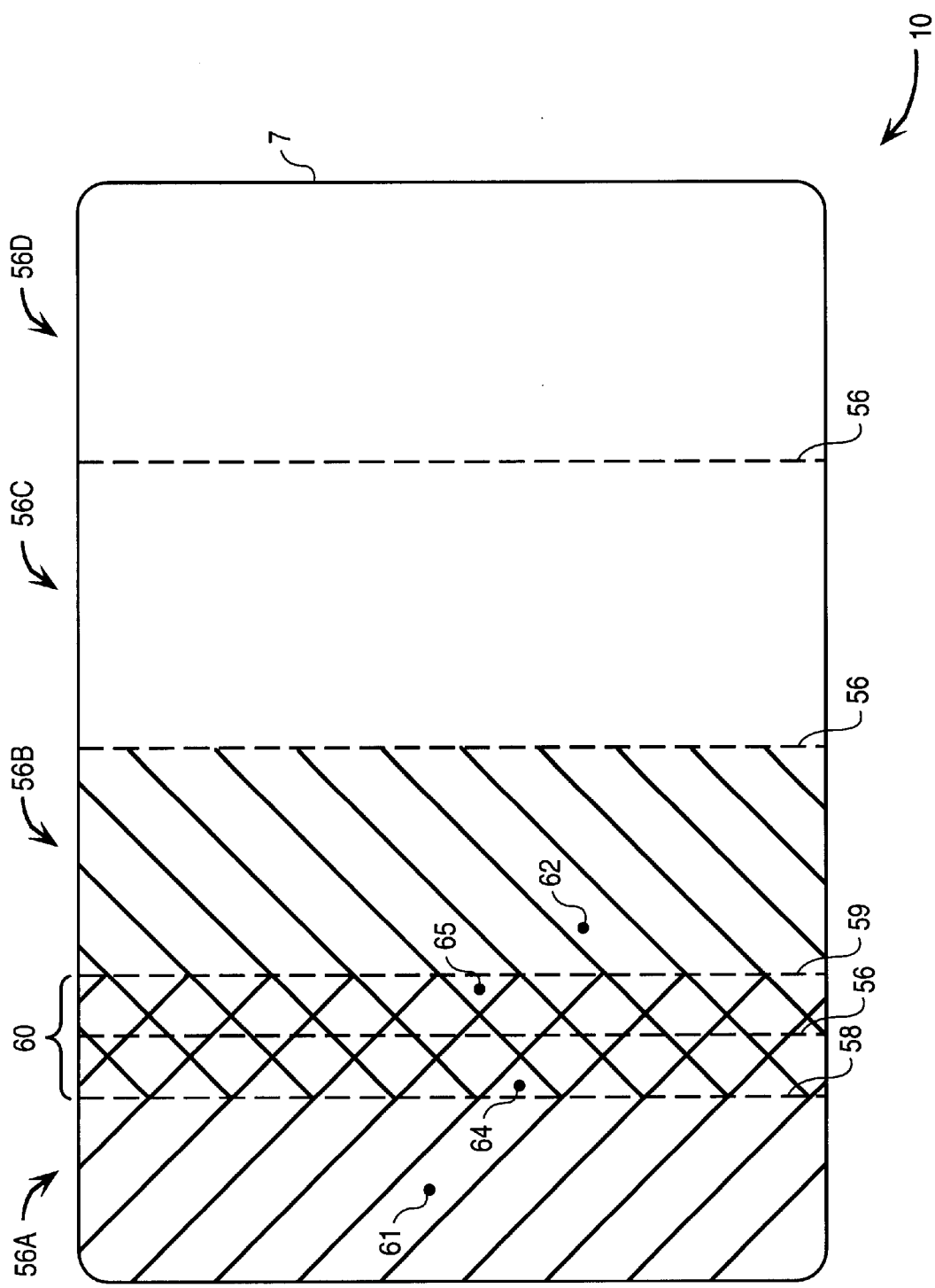
FIG. 7 illustrates overlapping zones of influence of a detector.

Refer now to FIG. 7, which illustrates an example of the zones of influence on the imaging surface 7 of a detector 10. The example of FIG. 7 corresponds to the four timing channels A, B, C, and D mentioned above (FIG. 6). The zones corresponding to timing channels 56A and 56B (zones of influence A and. B, respectively) overlap and are indicated by the shaded regions. The left boundary of zone B is indicated by line 58, while the right boundary of the zone A is indicated by lines 59. Region 60 is the region of overlap of zones A and B. Of course, there may also be overlap between the zones for timing channels B and C or between the zones for channels C and D, which is not shown. As noted, the boundaries 56 of the timing channels do not change from patient to patient. However, the overlap regions of zone influence may change.

Note that the imaging surface 7 corresponds to a two-dimensional matrix of pixels, which form an output image. Points 61, 62, 64, and 65 each represent a different pixel. The deadtime effects on any given pixel depend upon the zones within which the pixel falls. In particular, a pixel that is located within only one zone will be affected by the deadtime of only that zone. In contrast, the pixel that falls within more than one zone (i.e., within an overlap region) will be affected by the deadtime of each zone in which it is located. For example, pixel 61 falls within only zone A and therefore will be affected only by the deadtime $D_A$ of timing channel A. Similarly, pixel 62 falls within only zone B and therefore will be affected only by the deadtime $D_B$ of timing channel B. In contrast, pixel 64 and 65 each fall within the region of overlap 60 of timing channels A and B (i.e., within both zones A and B), even though each of these two pixels falls within the physical boundaries of only one timing channel. Consequently, the deadtime associated with each of pixels 64 and 65 is the product of the deadtimes of timing channels A and B, i.e., $D_A D_B$. Note that in a detector having a different configuration of timing channels, it may be possible to have overlap in the zones of influence of three or more timing channels. Consequently, the deadtime of any given pixel can be computed as the product of the deadtimes of each zone within which the pixel is located. In other words, a unique deadtime equation can be assigned to each unique overlap region of a zone influence map as well as each unique region of non-overlap. Each such equation is a function (e.g., representing the product) of the deadtimes of the corresponding timing channel(s).

Figure 8:
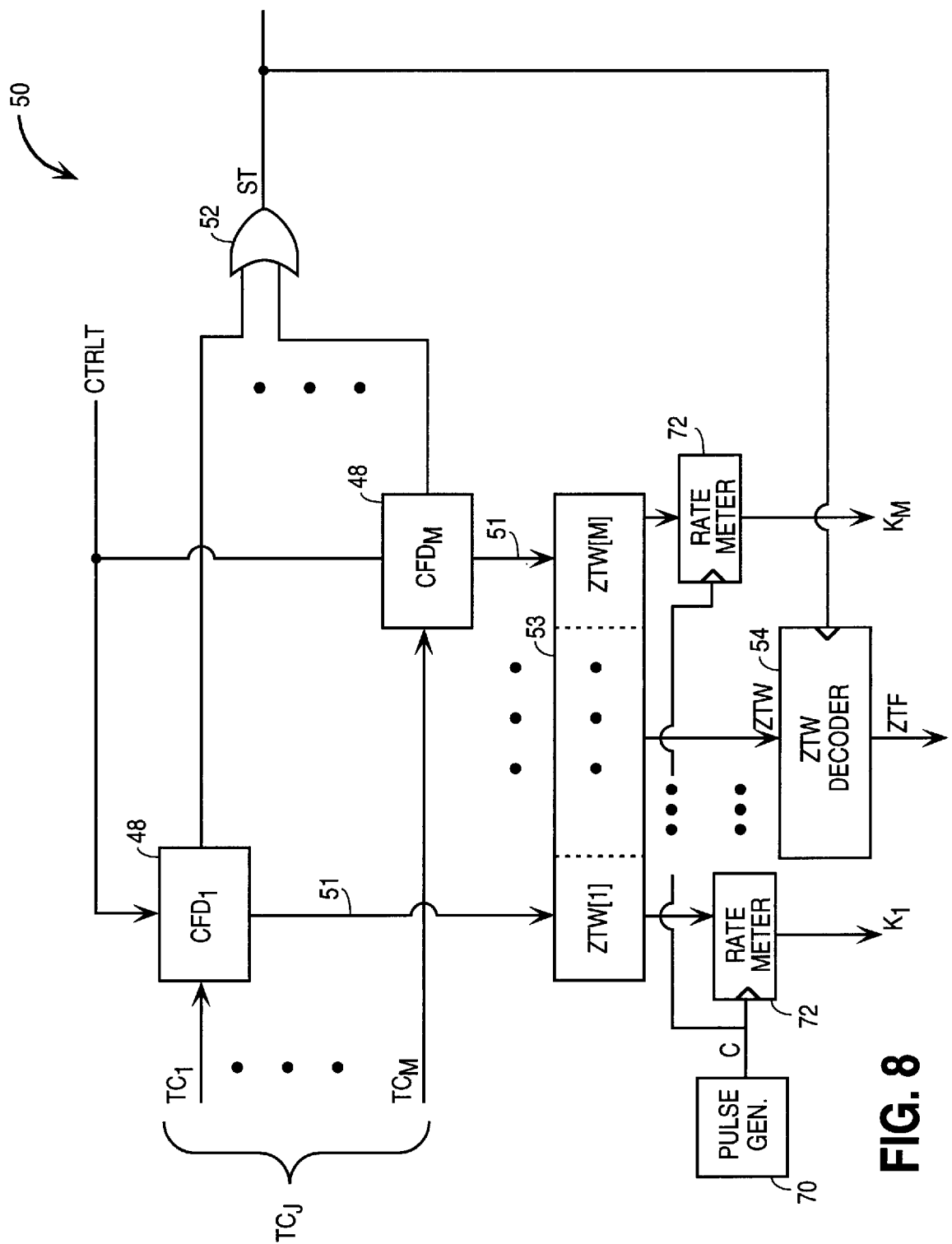
FIG. 8 illustrates the timing circuit of a detector.

In accordance with the above, the deadtime of each of the timing channels of each detector is independently measured. Based on the zone influence map and the deadtime measurements, the deadtime of each pixel can be independently computed, and hence, correct for, using the above described principles. Refer now to FIG. 8, which illustrates the timing circuit 50 in greater detail. Timing circuitry 50 includes features which enable the deadtime to be measured independently for each timing channel, as will be described. Timing circuitry 50 includes a number of constant fraction discriminators (CFDs) 48, i.e., one CFD 48 for each timing channel. Each of the timing channel outputs $TC_j$ is applied as input to a corresponding CFD 48. The CFDs 48 each provide amplitude-independent triggering to maintain tight timing tolerances. The details of the CFDs are not germane to the present invention. Each CFD 48 provides an output signal to an OR gate 52. The output of OR gate 52 is the trigger signal ST from the detector 10, which is applied to CDC 36 (FIG. 4). Each CFD 48 also outputs a signal 51 to ZTW register 49; each such signal 51 determines the state of a corresponding bit of ZTW register 49. Thus, the ZTW register 53 includes one bit for each timing channel, and the state of the ZTW bits identifies the particular timing channels that responded to a scintillation event for each timing cycle. The output ZTW of the ZTW register 53 is applied to ZTW decoder 54. ZTW decoder 54 maps the ZTW value to individual PMTs; that is, ZTW decoder determines which PMT channels are represented by each ZTW value. The mapping function is based on knowledge of which PMTs are included within each timing channel and their arrangement and the known light spread function. The output of ZTW decoder 54 is signal ZTF, which includes one bit for each PMT channel, and which is provided to integration circuitry 47 (FIG. 4), as noted above.

The deadtime of each timing channel is measured independently by using artificial trigger pulses to sample the count rate of each timing channel. Assume that a signal $T_j$ is active for a time duration A whenever an event occurs in a given timing channel j. The time A is the time during which timing channel j is busy. A timing-variant signal C may be defined having a fixed frequency, F. On each rising edge of signal C, the signal $T_j$ is sampled for a time period S, and the number of times $K_j$ that the signal $T_j$ is sampled as active is determined. Consequently, the deadtime $D_j$ of timing channel j may be computed according to the equation $D_j = K_j/(S*F)$.

Hence, referring to FIG. 8, deadtime is computed in this manner by employing a pulse generator 70 and M rate meters 72 (one rate meter for each timing channel) within timing circuit 50. The output C of the pulse generator 70 is applied to the clock input of each rate meter 72. Note that the specific parameters of the signal C, such as its frequency F, pulse width, etc., are not important and are implementation-specific. Each rate meter 72 is a counter that outputs a count value $K_j$. Each rate meter 72 also receives as input a different bit of the ZTW register 53. Each bit of the ZTW register 53 is assumed to be a transparent latch, in that any event in the output of a CFD 48 will appear at the input of the corresponding rate meter 72. Alternatively, the input of each rate meter 72 may be taken directly from the output of the corresponding CFD 48. The count value $K_j$ of each rate meter 72 represents the number of times during the time period S during which the corresponding timing channel is sampled as active. Accordingly, the deadtime $D_j$ is computed independently for each timing channel j according to the equation $D_j = K_j/(S*F)$. Deadtime computations may be performed within the detector or within the processing system 18. In the latter case, the count values $K_j$ may be provided to the processing system 18 via the DATA signals.

Once the deadtime of each timing channel is known, the image data can be corrected for deadtime on pixel-by-pixel basis, as described above in connection with FIG. 7, i.e. by combining deadtimes of two or more timing channels, if appropriate, given the zone influence map. Correcting the data for deadtime on a pixel-by-pixel basis corrects for variations in deadtime across the imaging surface of the detector.

Figure 9:
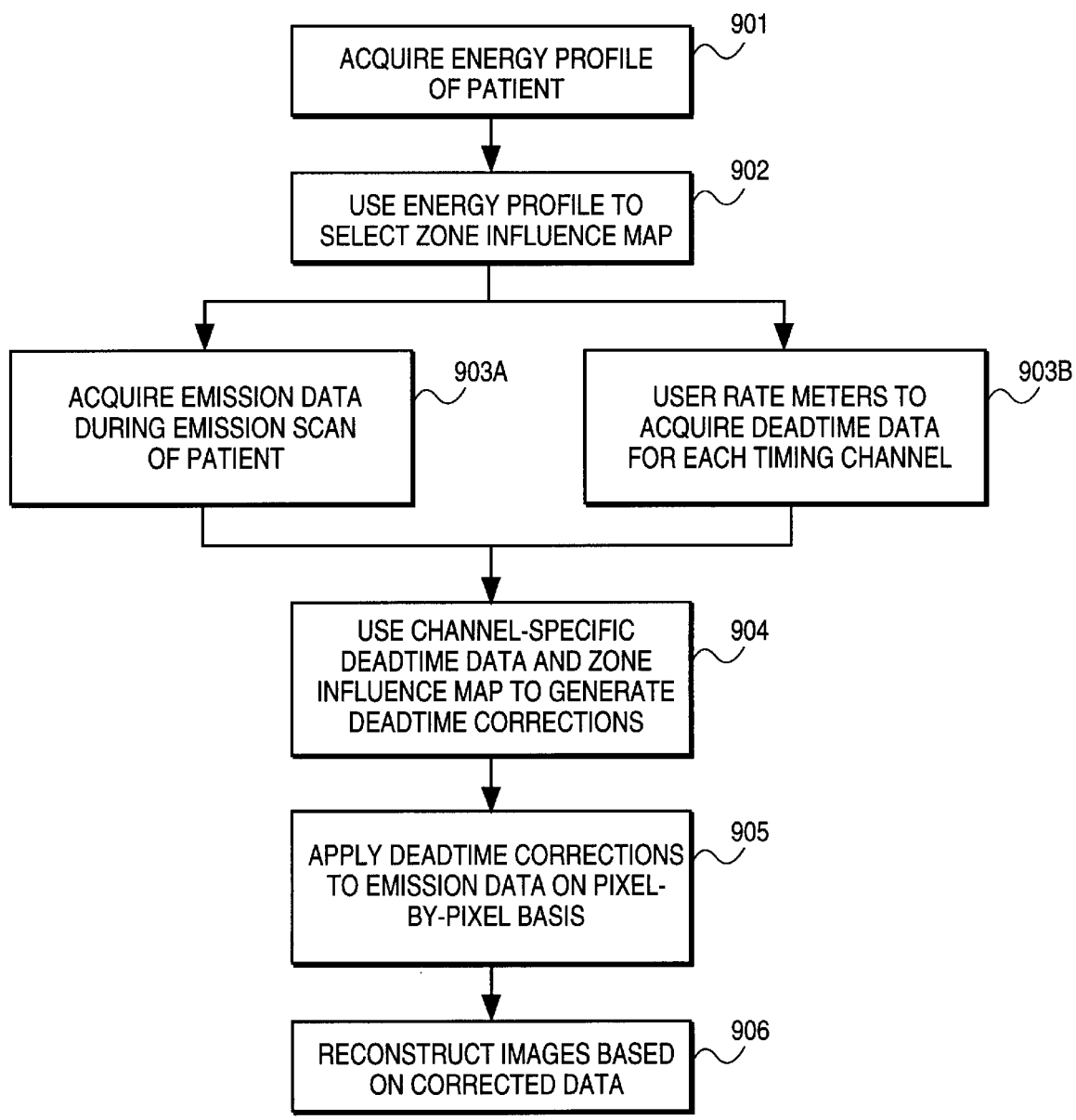
FIG. 9 is a flow diagram illustrating a procedure for correcting deadtime variations across the imaging surface of a detector.

FIG. 9 illustrates an example of a procedure that may be used to implement the above-described deadtime correction technique. At 901, an energy profile of the patient is acquired prior to performing a normal imaging scan. The energy profile may be acquired by using the detector to perform a simple emission scan of the patient from one or more angles of rotation. At 902, the energy profile is used to select a zone influence map from multiple, selectable zone influence maps. Each zone influence map specifies, for each pixel of the detector at a particular energy level (the input), the timing channels that will respond to an event at that pixel's location (the output). Each of the multiple zone influence maps corresponds to a particular energy level, and a zone influence map is ideally provided for every energy level that is expected to be encountered during clinical use of the system. The zone influence maps are based on simulation of operation of the detector, given the known physical configuration and device parameters of the detector, i.e., the PMT assignments to timing channel summing networks, the field of view of the scintillation crystal, and the light spread function (LSF). The zone influence maps may have any suitable format, such as one or more tables. A technique for generating the zone influence maps is described below in connection with FIG. 10.

To select the appropriate zone influence map, a particular energy level is taken or derived from the energy profile. For example, the zone influence map corresponding to the average energy level of the energy profile may be selected. It may be desirable to use the average energy level, rather than the photopeak, for example, since the average energy takes Compton scattering into consideration and is likely to be lower than the actual photopeak.

After selecting the appropriate zone influence map, the routine proceeds with a normal imaging scan at 903A and 903B, which are performed concurrently. At 903A, emission data of the patient is acquired using the detectors 10. At 903B, the rate meters 72 are used to acquire deadtime data for each timing channel. After all the emission data is acquired, at 904 this timing channel-specific deadtime data is applied to the selected zone influence map to generate deadtime correction factors. Note that the manner of generating such correction factors given the deadtime is well-known. For example, the emission data may be simply scaled up appropriately. At 905, the correction factors are applied to the emission data to correct the data on pixel-by-pixel basis. Note that this correction may be applied in either projection space or image space, as desired. Finally, at 906, images of the patient are reconstructed using conventional techniques based on the deadtime-corrected data.

In certain cases, it may be impractical or otherwise undesirable to acquire a separate energy profile or to generate a separate zone influence map for each patient. For such cases, it is possible to use a predetermined zone influence map that is not created based on the particular patient being imaged. Such map may be selected from a group of previously-acquired zone influence maps representing patients of various common body types. However, it is believed that selecting zone influence map based on the energy profile of each patient will generally yield better results.

As another alternative to, or modification of, the above routine, energy values may be obtained on an event-by-event basis during the normal, image data acquisition process (903A and 903B). Specifically, the energy of each observed event may be measured and used to select the appropriate zone influence map for that event. This approach avoids the need to acquire a separate energy profile (901) of the patient.

Figure 10:
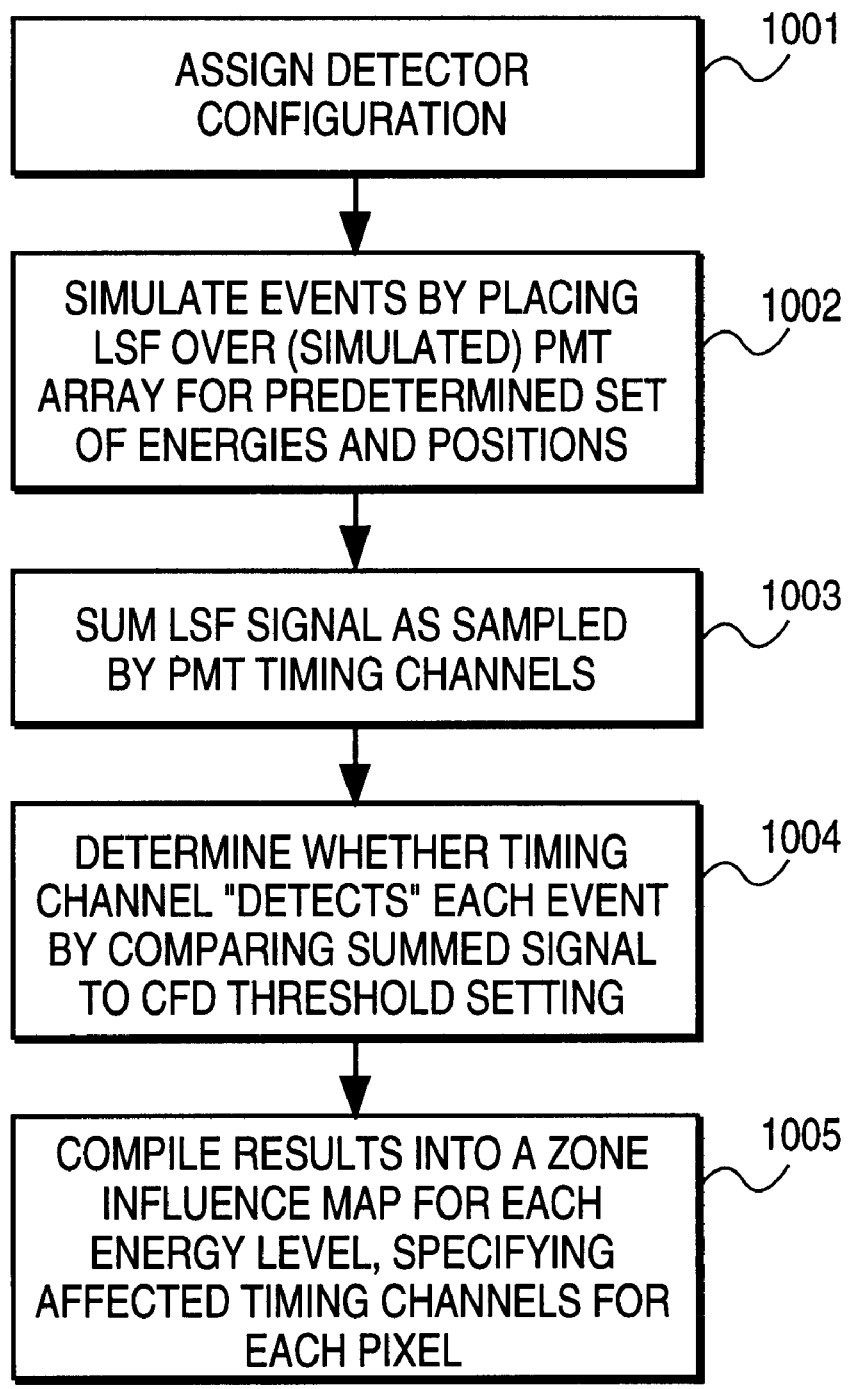
FIG. 10 is a flow diagram illustrating a procedure for generating zone influence maps for various energy levels.

FIG. 10 illustrates an example of a procedure that may be used to generate the zone influence maps for various energy levels. The routine of FIG. 10 is assumed to be performed prior to a clinical imaging session, such as during the design or testing of the imaging system. At 1001, the detector configuration is assigned, including assignment of PMT positions, determination of the field of view and the LSF, and assignment of each PMT to a timing channel summing network. At 1002, operation of the detector is simulated by applying the LSF to a simulation of the detector, using various positions and energy levels. The simulation may be software-based, hardware-based, or a combination of hardware and software-based simulations. At 1003, the LSF signal, as sampled by the simulated timing channels, is summed by the simulated timing channel summing networks. Next, at 1004 it is determined which simulated timing channels "detected" each event by comparing the summed signal values to the CFD threshold settings. If a timing channel is determined to have detected an event, then that timing channel is determined to be affected for that location and energy. At 1005, the results of 1004 are organized into a number of separate zone influence maps, one for each energy level, each map specifying the timing channels affected for each pixel.

Note that aspects of the above-described deadtime correction techniques may be embodied in software. For example, the techniques may be carried out in the processing system 18 (FIG. 2A) in response to its CPU 20 (FIG. 3) executing sequences of instructions contained in memory. The instructions may be executed from RAM, for example, and may be loaded from a persistent store, such as a mass storage device and/or from one or more other computer systems. In various embodiments, hardwired circuitry may be used in place of, or in combination with, software instructions to implement the deadtime correction techniques. Thus, the above-described techniques are not limited to any specific combination of hardware circuitry and software, nor to any particular source for software instructions.

Thus, a method and apparatus for correcting for spatial variations in deadtime across the imaging surface of a monolithic scintillator based detector have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of operation in an imaging system, the imaging system having a radiation detector including a monolithic scintillator, the radiation detector having deadtime associated therewith, the method comprising:

generating data of an object in response to radiation detected by the detector, including collection of deadtime data associated with the detector while generating said data of the object;

correcting said data of the object for said collected deadtime data, including correcting said, data of the object for spatial variations in said collected deadtime data across an imaging area of the monolithic scintillator; and generating an image of the object based on the corrected data.

2. A method as recited in claim 1, wherein the image includes a plurality of fundamental image elements, and wherein said correcting comprises correcting the data of the object in accordance with said collected deadtime data independently for each of the fundamental image elements.

3. A method as recited in claim 1, wherein said correcting of said data of the object comprises applying the collected deadtime data to a plurality of deadtime functions, each of the deadtime functions corresponding to a unique subset of an imaging area of the detector, and each of the fundamental image elements being associated with one of the subsets.

4. A method as recited in claim 3, wherein each of the deadtime functions is a function of a sampling of events detected for a corresponding one of the subsets.

5. A method. as recited in claim 1, wherein said correcting of said data of the object in accordance with said collected deadtime data comprises:

acquiring an energy profile of the object; and using also the energy profile in said correcting of said data of the object in accordance with the collected deadtime data.

6. A method of operation in an imaging system, the method comprising:

generating image data of an object in response to events detected by a detector of the imaging system;

applying collected deadtime data to a plurality of deadtime functions while generating the image data, each of the deadtime functions corresponding to a different subset of an imaging area of the detector; and correcting the image data based on the result of said application of said collected deadtime data to said plurality of deadtime functions.

7. A method as recited in claim 6, wherein the image data represents a plurality of fundamental image elements, and wherein said correcting of the image data comprises correcting the image data independently for each of the fundamental image elements using the result of said application of said collected deadtime data.

8. A method as recited in claim 6, wherein each of the deadtime functions is a function of a sampling of the events detected at a corresponding subset of the imaging area of the detector.

9. A method as recited in claim 6, wherein said correcting of the image data comprises:
  acquiring an energy profile of the object; and
  using also the energy profile in said correcting of the image data in accordance with the collected deadtime data.

10. A method as recited in claim 9, wherein said detector comprises a block detector.

11. A method of operation in an imaging system, the method comprising:
  generating image data of an object in response to event-based triggers;
  collecting and applying deadtime data based on a sampling of the event-based triggers while generating the image data; and
  using the applied deadtime data to correct the image data of the object.

12. A method as recited in claim 11, the image data representing a plurality of fundamental image elements, further comprising using the applied deadtime data to correct the image data of the object independently for each of the fundamental image elements.

13. A method as recited in claim 11, wherein said applying of deadtime data comprises applying the deadtime data to a plurality of deadtime functions, each of the deadtime functions corresponding to a different subset of an imaging area of a detector of the imaging system, each of the fundamental image elements corresponding to one of the subsets of an imaging surface of the detector.

14. A method of operation in an imaging system, the method comprising:
  detecting events using a plurality of subsets of an imaging area of a detector of the imaging system;
  generating image data of an object in response to the detected events, the image data representing a plurality of fundamental image elements;
  collecting and applying deadtime data based on the detected events and a plurality of deadtime functions while generating the image data, each of the deadtime functions corresponding to a different one of the subsets; and
  using the applied deadtime data to correct the image data independently for each of the fundamental image elements.

15. A method as recited in claim 14, wherein each of the deadtime functions is a function of a sampling of the events detected at a corresponding subset of the imaging area of the detector.

16. A method as recited in claim 14, wherein the detector has a plurality of overlapping timing zones, wherein the plurality of deadtime functions comprise a deadtime function for each region of overlap of two or more of said overlapping timing zones.

17. A method as recited in claim 16, wherein the detector comprises a monolithic scintillator, such that the plurality of timing zones comprise a plurality of timing zones of said monolithic scintillator.

18. A method as recited in claim 16, wherein said collecting and applying of the deadtime data comprises:
  generating a plurality of sample pulses to sample the events detected in each of the timing zones; and
  collecting and applying the deadtime data for each of the fundamental image elements based on the sampled events and the deadtime functions.

19. A method as recited in claim 16, wherein said collecting and applying of the deadtime data based on the detected events and a plurality of deadtime functions comprises using an energy-dependent zone influence map in said collecting and application of the deadtime data, wherein the zone influence map indicates said regions of overlap.

20. A method as recited in claim 19, wherein said using an energy dependent zone influence map in said collecting and application of the deadtime data comprises determining the zone influence map indicating said regions of overlap by:
  acquiring an energy profile of the object; and
  using the energy profile and characteristics of the detector to select the zone influence map.

21. A method as recited in claim 20, wherein the detector comprises a plurality of block detectors.

22. A method as recited in claim 20, wherein said using of the energy profile and characteristics of the detector to select the zone influence map comprises selecting one of a plurality of zone influence maps based on the energy profile.

23. A method of operation in a medical imaging system, the medical imaging system including a detector, the detector having a plurality of zones with at least one overlap region, each overlap region representing a region of the detector in which a detected event may affect more than one of the zones, the method comprising:
  generating image data of an object in response to a plurality of events detected by the detector, the image data representing a plurality of fundamental image elements;
  collecting and applying deadtime data based on the detected events and a plurality of deadtime functions while generating the image data, the plurality of deadtime functions including a deadtime function for each overlap region; and
  correcting each of the fundamental image elements based on a portion of the applied deadtime data, each of said portion of the applied deadtime data resulting from one of the deadtime functions associated with a subset of said fundamental image elements.

24. A method as recited in claim 23, wherein each of the plurality of zones is a timing zone.

25. A method as recited in claim 23, wherein said collecting and applying of the deadtime data comprises:
  sampling the radiation-induced event triggers; and
  collecting and applying the deadtime data for each of the pixels based on the sampling and the deadtime functions.

26. A method as recited in claim 23, further comprising determining a zone influence map specifying the plurality of zones and the plurality of overlap regions, wherein said generating the zone influence map comprises:
  acquiring an energy profile of the object; and
  using the energy profile and characteristics of the detector to determine the zone influence map.

27. A method as recited in claim 26, wherein said determining the zone influence map comprises selecting one of a plurality of selectable zone influence maps based on the energy profile of the object.

28. A method as recited in claim 24, wherein the detector comprises a monolithic scintillator, the plurality of zones comprising a plurality of zones of the monolithic scintillator.

29. A method of operation in a medical imaging system, the method comprising:
  generating a zone influence map, the zone influence map specifying a plurality of timing zones of a detector of the imaging system, including specifying a plurality of overlap regions, each the overlap regions representing a region of the detector in which a detected event may affect more than one of the timing zones;

generating image data of an object in response to a plurality of events detected by the detector, the image data representing a plurality of pixels;

collecting and applying deadtime data based on the detected events, the zone influence map, and a plurality of deadtime functions, the plurality of deadtime functions including a separate deadtime function for each of the overlap regions while generating the image data; and correcting each of the pixels based on a subset of the results of said collecting and application of the deadtime data, each of said subsets of the results of said collecting and application of the deadtime data resulting from one of the deadtime functions associated with a subset of said pixels.

30. A method as recited in claim 29, wherein the deadtime function for each overlap region is based on a number of sampled counts for each of the zones associated with said overlap region.

31. A method as recited in claim 29, wherein said collecting and applying of the deadtime data comprises collecting a sampling of the events for each of the zones, wherein each of the deadtime functions represents a function of one or more of said samplings.

32. A method as recited in claim 29, wherein said generating the zone influence map comprises:

simulating operation of the detector; and identifying said overlap regions based on said simulation.

33. A method as recited in claim 32, further comprising:

acquiring an energy profile of the object; and selecting the zone influence map from among a plurality of zone influence maps based on the energy profile.

34. A method as recited in claim 29, wherein the detector comprises a monolithic scintillator, the plurality of zones comprising a plurality of zones of the monolithic scintillator.

35. A method of operation in a nuclear medicine imaging system, the method comprising:

selecting a zone influence map, the zone influence map specifying a plurality of zones of a detector of the imaging system, including specifying a plurality of overlap regions, each the overlap regions representing a region of the detector in which a radiation-induced event may affect more than one of the zones;

generating image data of an object in response to a plurality of radiation-induced event triggers of the detector, the image data including a plurality of pixels;

collecting and applying deadtime data for each of the pixels based on the radiation-induced event triggers and a plurality of deadtime functions while generating the image data, the plurality of deadtime functions including a deadtime function for each of the overlap regions, wherein the deadtime function for each overlap region is based on a number of counts measured for each of the zones associated with said overlap region; and correcting each pixel based on a subset of the results of the collected and applied deadtime data, each of said subsets of the results of the collected and applied deadtime data resulting from one of the deadtime functions associated with said pixel.

36. A method as recited in claim 35, wherein said collecting and applying of the deadtime data comprises:

generating a plurality of sample pulses; and collecting and applying the deadtime data for each of the pixels based on the plurality of sample pulses, the radiation-induced event triggers, and the deadtime functions while generating the sample pulses, wherein each of said measured counts represents a coincidence between one of the radiation-induced event triggers and one of the sample pulses.

37. A method as recited in claim 35, wherein said selecting the zone influence map comprises:

using the detector to acquire an energy profile of the object to be imaged; and selecting the zone influence map based on the energy profile.

38. A method as recited in claim 35, wherein the detector comprises a monolithic scintillator, the plurality of zones comprising a plurality of zones of the monolithic scintillator.

39. A method of operation in a nuclear medicine imaging system, the method comprising:

acquiring an energy profile of an object to be imaged;

using the energy profile to select a zone influence map from a plurality of selectable zone influence maps, the zone influence map specifying a plurality of zones of a detector of the imaging system, including specifying a plurality of overlap regions, each the overlap regions representing a region of the detector in which a scintillation event may affect more than one of the zones;

generating image data of the object in response to scintillation event based triggers of the detector, the image data representing a plurality of pixels;

collecting and applying deadtime data based on the scintillation event based triggers of the detector, the zone influence map, and a plurality of deadtime functions, the plurality of deadtime functions including a different deadtime function for each of the overlap regions while generating the image data, wherein the deadtime function for each overlap region is based on a number of sampled counts for each of the zones associated with said overlap region, said number of sampled counts representing a number of coincidences between the scintillation event based triggers of the detector and a plurality of sample pulses;

correcting the image data on a pixel-by-pixel basis using the results of the collected and applied deadtime data to generate deadtime-corrected image data, including correcting each pixel based on a subset of the results of the collected and applied deadtime data, each of said subsets of the results of the collected and applied deadtime data resulting from one of the deadtime functions associated with said pixel; and generating an image of the object based on the deadtime-corrected image data.

40. A method as recited in claim 39, wherein the zone influence map is a function of physical characteristics of the detector.

41. A method as recited in claim 40, wherein the detector comprises a, the plurality of zones comprising a plurality of zones of the monolithic scintillator.

42. A method of operation in a nuclear medicine imaging system, the method comprising:

providing a plurality of zone influence maps, each zone influence map based on physical characteristics of a monolithic scintillation detector of the imaging system, each zone influence map corresponding to a particular energy level and specifying a plurality of timing zones of the detector, including specifying a plurality of overlap regions for said energy level, each the overlap regions representing a region of the detector in which a scintillation event may affect more than one of the timing zones;

using the detector to acquire an energy profile of an object to be imaged based on radiation emitted from the object;

using the energy profile to select one of the zone influence maps;

generating emission data of the object in response to scintillation event based triggers of the detector, the emission data representing a plurality of pixels;

collecting and applying deadtime data based on the emission data, the selected zone influence map, and a plurality of deadtime functions, the plurality of deadtime functions including a different deadtime function for each of the overlap regions specified by the selected zone influence map while generating the emission data of the object, wherein the deadtime function for each overlap region is based on a number of counts measured for each of the zones associated with said overlap region, said counts representing coincidences between scintillation event based triggers of the detector and a plurality of sample pulses;

correcting the emission data on a pixel-by-pixel basis using the results of said collection and application of the deadtime data to generate deadtime-corrected emission data, including correcting each pixel based on a subset of the results of said collection and application of deadtime data, each of said subsets of the deadtime data resulting from one of the deadtime functions associated with said pixel; and generating an image of the object based on the deadtime-corrected emission data.

43. A nuclear medicine imaging system comprising:

a radiation detector to generate data of an object in response to detected radiation, the radiation detector including a monolithic scintillator, the radiation detector having deadtime associated therewith;

means for collecting deadtime data for said deadtime associated with said detector while generating said data of the object;

means for correcting the data of the object in accordance with said collected deadtime data, including means for correcting for spatial variations in said collected deadtime data with respect to an imaging area of the monolithic scintillator; and means for generating images of the object based on the corrected data of the object.

44. A nuclear medicine imaging system as recited in clam 43, wherein the imaging area of the monolithic scintillator corresponds to a plurality of pixels of an image, and wherein said means for correcting the data of the object based on the collected deadtime data comprises means for correcting the image data based on the collected deadtime data separately for each of the pixels.

45. A nuclear medicine imaging system as recited in claim 44, wherein said means for collecting and applying deadtime data comprises means for applying the collected deadtime data to a plurality of deadtime functions, each of the deadtime functions corresponding to a different subset of an imaging area of the detector, each of the pixels corresponding to one of the subsets of the imaging surface of the detector.

46. A nuclear medicine imaging system as recited in claim 44, wherein each of the deadtime functions is a function of a sampling of the events detected at a corresponding subset of the imaging area of the detector.

47. A nuclear medicine imaging system comprising:

a radiation detector for detecting radiation-induced events;

means for generating image data of an object in response to the radiation-induced events;

means for collecting and applying deadtime data based on a sampling of the event-based triggers while generating the image data; and means for using the collected and applied deadtime data to correct the image data.

48. A nuclear medicine imaging system as recited in claim 47, the image data representing a plurality of fundamental image elements, further comprising means for using the collected and applied deadtime data to correct the image data independently for each of the fundamental image elements.

49. A nuclear medicine imaging system as recited in claim 48, wherein said means for collecting and applying deadtime data comprises means for applying the collected deadtime data based on a plurality of deadtime functions, each of the deadtime functions corresponding to a different subset of an imaging area of the detector, each of the fundamental image elements corresponding to one of the subsets of the imaging surface of the detector.

50. A medical imaging system comprising:

a plurality of radiation detectors, each of the detectors having an imaging area comprising a plurality of zones to detect events at each of the zones, each of the detectors employed to generate event data of an object in response to the detected events, each of the detectors further employed to generate a sampling of the detected events for each of the zones;

a processing system coupled to each of the detectors, the processing system configured to generate image data based on the event data, the image data representing a plurality of fundamental image elements, the processing system further employed to collect and apply deadtime data based on said samplings and a plurality of deadtime functions while generating the image data, the processing system further employed to use the results of said collection and application of deadtime data to correct the image data independently for each of the fundamental image elements.

51. A medical imaging system as recited in claim 50, wherein the plurality of zone overlap at a plurality of overlap regions, and wherein the plurality of deadtime functions comprises a deadtime function for each of the overlap regions.

52. A medical imaging system as recited in claim 51, wherein the detector comprises a monolithic scintillator, the plurality of zones comprising a plurality of zones of the monolithic scintillator.

53. A nuclear medicine imaging system comprising:

a gantry;

a plurality of radiation detectors supported by the gantry so as to be rotatable about an object to be imaged, each of the detectors having an imaging area comprising a plurality of timing zones to detect events at each of the zones, wherein the plurality of timing zones overlap in at least one overlap region for a given energy-level, each of the detectors employed to generate event data of the object in response to the detected events, each of the detectors further employed to acquire a sampling of the detected events; and a processing system coupled to each of the detectors to generate image data based on the event data, the processing system further employed to collect and apply deadtime data based on a plurality of deadtime functions and said samplings of the detected events while generating said image data, and wherein the plurality of deadtime functions includes a deadtime function for each of the at least one overlap regions, the processing system further configured to use the results of the collected and applied deadtime data to correct the image data.

54. A nuclear medicine imaging system as recited in claim 53, wherein the processing system is further configured to use the corrected image data to generate a tomographic image of the object.

55. A nuclear medicine imaging system as recited in claim 53, wherein the image data comprises a plurality of pixels, and wherein the processing system is configured to correct the image data by applying to each pixel the result of applying the collected deadtime data to one of the deadtime functions which corresponds to the pixel.

56. A nuclear medicine imaging system as recited in claim 55, wherein said one of the deadtime functions which corresponds to said pixel is a function of the samplings of the detected events for all of the timing zones to which said pixel corresponds, as specified by said at least one overlap region.

57. A nuclear medicine imaging system as recited in claim 55, wherein the detector comprises a monolithic scintillator, the plurality of zones comprising a plurality of zones of the monolithic scintillator.

* * * * *